US012090761B2

(12) United States Patent
Masuda

(10) Patent No.: US 12,090,761 B2
(45) Date of Patent: Sep. 17, 2024

(54) PRINTING APPARATUS

(71) Applicant: SEIKO EPSON CORPORATION, Tokyo (JP)

(72) Inventor: Norihiro Masuda, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 136 days.

(21) Appl. No.: 17/811,714

(22) Filed: Jul. 11, 2022

(65) Prior Publication Data

US 2023/0020312 A1 Jan. 19, 2023

(30) Foreign Application Priority Data

Jul. 14, 2021 (JP) ................................ 2021-116348

(51) Int. Cl.
*B41J 2/165* (2006.01)

(52) U.S. Cl.
CPC ................................ *B41J 2/16517* (2013.01)

(58) Field of Classification Search
CPC ...... B41J 2/16517; B41J 2/1714; B41J 2/165; B41J 2002/1853
See application file for complete search history.

(56) References Cited

U.S. PATENT DOCUMENTS

2014/0240397 A1* 8/2014 Masuda ................ B41J 2/1714
347/34

FOREIGN PATENT DOCUMENTS

| | | | | | |
|---|---|---|---|---|---|
| JP | 2004180143 | A | * | 6/2004 | |
| JP | 2013-226699 | A | | 11/2013 | |
| JP | 6460674 | B2 | * | 1/2019 | .......... B41J 2/16585 |
| WO | WO-2015087862 | A1 | * | 6/2015 | ................ B41J 2/17 |

* cited by examiner

*Primary Examiner* — Sharon Polk
(74) *Attorney, Agent, or Firm* — WORKMAN NYDEGGER

(57) ABSTRACT

A printer includes a printing unit that ejects an ink from an inkjet head onto a medium, and a mist suction unit that suctions mist of the ink. The printing unit includes a first inkjet head, and a second inkjet head provided downstream of the first inkjet head in a transport direction of the medium. The mist suction unit includes a first mist suction device provided between the first inkjet head and the second inkjet head in the transport direction, a second mist suction device provided downstream of the second inkjet head in the transport direction, a first flow path coupling a blower and the first mist suction device, and a second flow path coupling the blower and the second mist suction device. A suction force of the second mist suction device is stronger than a suction force of the first mist suction device.

10 Claims, 7 Drawing Sheets

PRINTING APPARATUS

The present application is based on, and claims priority from JP Application Serial Number 2021-116348, filed Jul. 14, 2021, the disclosure of which is hereby incorporated by reference herein in its entirety.

BACKGROUND

1. Technical Field

The disclosure relates to a printing apparatus.

2. Related Art

In related art, a technique for collecting ink mist generated from an inkjet head is known. For example, JP-A-2013-226699 discloses a printer that uses a suction container to collect ink mist floating in a space between an inkjet ejection head and a platen drum. The printer disclosed in JP-A-2013-226699 includes the suction container downstream of each of a plurality of the inkjet heads in a transport direction of a printing medium.

In the printer disclosed in JP-A-2013-226699, the greater an amount of ink ejected, the greater an amount of ink mist generated from the inkjet head. Thus, there is a possibility that some of the ink mist may not be collected by the suction container. The ink mist that is not collected by the suction container flows in the transport direction of the printing medium, and can be collected by the suction container provided further downstream in the transport direction of the printing medium. However, since the number of suction containers capable of collecting the ink mist decreases the further downstream in the transport direction of the printing medium, the further downstream the inkjet head generating the ink mist is disposed, the more likely the ink mist is to be dispersed inside the printer.

SUMMARY

A printing apparatus according to an aspect for solving the problem described above includes a transport unit configured to transport a printing medium, a supporting member configured to support the printing medium transported by the transport unit, a printing unit including an inkjet head and configured to eject an ink from the inkjet head onto the printing medium supported by the supporting member, to print an image on the printing medium, and a mist suction unit configured to suction a mist of the ink. The printing unit includes a first inkjet head, and a second inkjet head provided downstream of the first inkjet head in a transport direction of the printing medium. The mist suction unit includes a first mist suction unit provided between the first inkjet head and the second inkjet head in the transport direction, a second mist suction unit provided downstream of the second inkjet head in the transport direction, a first flow path coupling the first mist suction unit with a suction force generating unit configured to generate a suction force of the first mist suction unit and the second mist suction unit, and a second flow path coupling the suction force generating unit with the second mist suction unit. The suction force of the second mist suction unit is stronger than the suction force of the first mist suction unit.

DESCRIPTION OF EXEMPLARY EMBODIMENTS

First Embodiment

A first embodiment will be described.

Figure 1:
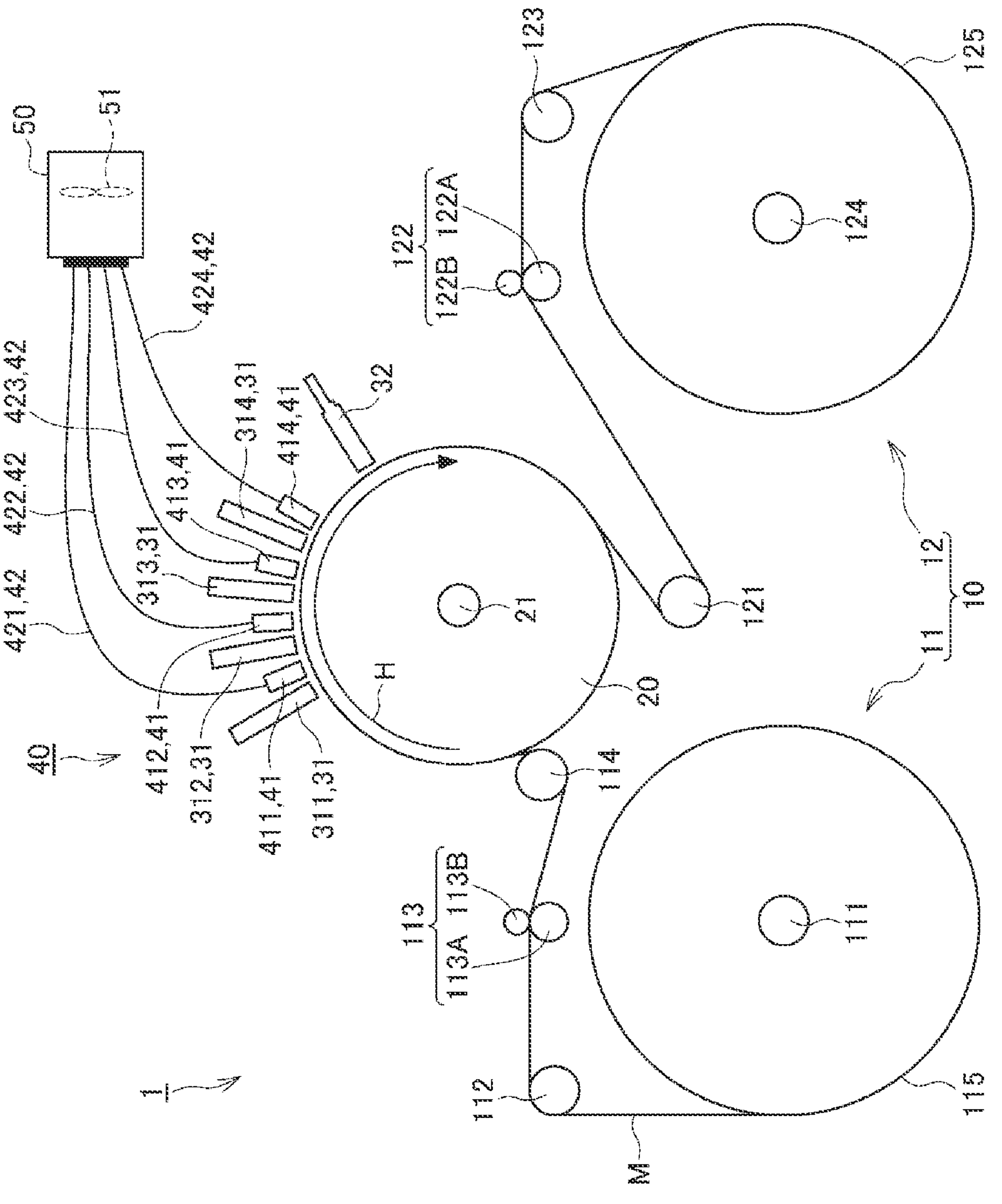
FIG. 1 is a diagram illustrating a configuration of a printer.

FIG. 1 is a diagram illustrating a configuration of a printer 1 according to the first embodiment.

The printer 1 corresponds to an example of a printing apparatus.

The printer 1 is an inkjet printer including an inkjet head 31. The printer 1 ejects an ink onto a medium M wound in a roll shape, to print an image. The printer 1 receives print data from an external device such as a PC (personal computer), and performs printing based on the received print data. Examples of the type of the medium M include plain paper, fine paper, a synthetic resin film, and the like.

The medium M corresponds to an example of a printing medium.

The printer 1 includes a transport unit 10, a platen drum 20, a printing unit 30, and a mist suction unit 40.

The platen drum 20 corresponds to an example of a supporting member.

The transport unit 10 transports the medium M in a transport direction H. The transport unit 10 includes a feeding unit 11 that feeds the medium M to the printing unit 30, and a winding unit 12 that takes up the medium M printed by the printing unit 30.

The feeding unit 11 supplies the medium M to the platen drum 20. The feeding unit 11 includes a feeding shaft 111, driven rollers 112 and 114, and a feeding roller pair 113. The feeding shaft 111 rotates in the clockwise direction in FIG. 1 using the power of a feed motor 116. A roll body 115 obtained by repeatedly winding the medium M into a roll shape is mounted on the feeding shaft 111, and the medium M is fed from the roll body 115 by rotation of the feeding shaft 111. The driven roller 112 is provided between the feeding shaft 111 and the feeding roller pair 113 in the transport direction H. The medium M fed from the roll body 115 is wound over the driven roller 112. The feeding roller pair 113 is provided between the driven roller 112 and the driven roller 114 in the transport direction H. The feeding roller pair 113 includes a feeding driving roller 113A and a feeding driven roller 113B. In a state in which the medium M is sandwiched between the feed driving roller 113A and the feeding driven roller 113B, the feeding driving roller 113A of the feeding roller pair 113 rotates in the clockwise direction in FIG. 1. As a result, the feeding roller pair 113 supplies the medium M wound over the driven roller 112 to the platen drum 20. The driven roller 114 is provided between the feeding roller pair 113 and the platen drum 20 in the transport direction H. The medium M supplied by the feeding roller pair 113 to the platen drum 20 is wound over the driven roller 114.

The platen drum 20 supports the medium M fed from the feeding unit 11. The platen drum 20 is a cylindrical drum that rotates about a rotary shaft 21, supports the medium M on the outer circumferential surface thereof, and rotates in the clockwise direction in FIG. 1, to transport the medium M in the transport direction H.

The printing unit 30 prints an image on the medium M supported by the platen drum 20 using the inkjet head 31. The printing unit 30 includes a plurality of the inkjet heads 31 having different ink colors, respectively. Each of the inkjet heads 31 is provided so that a nozzle surface thereof faces the outer circumferential surface of the platen drum 20 with a predetermined gap provided between the nozzle surface and the outer circumferential surface of the platen drum 20.

Each of the inkjet heads 31 is a line-type head extending in a direction intersecting the transport direction H of the medium M. The printing unit 30 according to this embodiment includes the inkjet head 31 that ejects cyan ink, the inkjet head 31 that ejects magenta ink, the inkjet head 31 that ejects yellow ink, and the inkjet head 31 that ejects black ink.

Hereinafter, the inkjet head 31 that ejects the cyan ink will be referred to as a "cyan head" and denoted by a reference sign of "311". Further, the inkjet head 31 that ejects the magenta ink will be referred to as a "magenta head" and denoted by a reference sign of "312". Further, the inkjet head 31 that ejects the yellow ink will be referred to as a "yellow head" and denoted by a reference sign of "313". Further, the inkjet head 31 that ejects the black ink will be referred to as a "black head" and denoted by a reference sign of "314".

The inkjet heads 31 are provided in the order of the cyan head 311, the magenta head 312, the yellow head 313, and the black head 314 from upstream to downstream in the transport direction H. The ink ejected by each of the inkjet heads 31 is a UV (ultraviolet) ink that is cured by being irradiated with UV light. Thus, the printing unit 30 includes a UV irradiator 32.

The UV irradiator 32 is provided so that an ultraviolet light irradiation surface thereof faces the outer circumferential surface of the platen drum 20 with a predetermined gap provided between the ultraviolet light irradiation surface and the outer circumferential surface of the platen drum 20. The UV irradiator 32 is provided between the black head 314 and the driven roller 121 in the transport direction H, and cures the inks ejected by the cyan head 311, the magenta head 312, the yellow head 313, and the black head 314.

The medium M on which an image is printed by the printing unit 30 is taken up by the winding unit 12.

The winding unit 12 includes driven rollers 121 and 123, a winding roller pair 122, and a winding shaft 124. The driven roller 121 is provided between the platen drum 20 and the winding roller pair 122 in the transport direction H, and the medium M on which the image is printed by the printing unit 30 is wound over the driven roller 121. The winding roller pair 122 is provided between the driven roller 121 and the driven roller 123 in the transport direction H. The winding roller pair 122 includes a winding driving roller 122A and a winding driven roller 122B. In a state in which the medium M is sandwiched between the winding driving roller 122A and the winding driven roller 122B, the winding driving roller 122A of the winding roller pair 122 rotates in the clockwise direction in FIG. 1. As a result, the winding roller pair 122 supplies the medium M wound over the driven roller 121 to the winding shaft 124. The driven roller 123 is provided between the winding roller pair 122 and the winding shaft 124 in the transport direction H, and the medium M supplied by the winding roller pair 122 is wound over the driven roller 123. The winding shaft 124 rotates in the clockwise direction in FIG. 1 using the power of a winding motor 126. A roll body 125 is mounted on the winding shaft 124, and by rotating the roll body 125, the medium M is wound around the roll body 125.

The mist suction unit 40 suctions ink mist generated by the inkjet head 31 using a mist suction device 41. The number of mist suction devices 41 included in the mist suction unit 40 corresponds to the number of inkjet heads 31. The mist suction device 41 is coupled to a mist suction pipe 42, which is coupled to a blower 50. The mist suction pipe 42 forms a flow path through which the ink mist flows from the mist suction device 41 toward the blower 50. A mist suction opening through which the ink mist is suctioned is formed in the mist suction device 41. The mist suction device 41 suctions the ink mist via the mist suction opening using a suction force generated by the blower 50. The blower 50 includes a fan 51. The blower 50 rotates the fan 51 to generate the suction force of the mist suction device 41. The blower 50 generates the same suction force for each of the mist suction devices 41.

The mist suction unit 40 includes a cyan mist suction device 411 and a cyan mist suction pipe 421. The cyan mist suction device 411 is the mist suction device 41 provided corresponding to the cyan head 311. The cyan suction pipe 421 is the mist suction pipe 42 that forms a flow path coupling the cyan mist suction device 411 and the blower 50. The cyan mist suction device 411 is provided between the cyan head 311 and the magenta head 312 in the transport direction H. A mist suction opening is formed in the cyan mist suction device 411. The cyan mist suction device 411 is provided so that the mist suction opening thereof faces the outer circumferential surface of the platen drum 20, and is configured to suction ink mist generated by the cyan head 311. The ink mist suctioned by the cyan mist suction device 411 is collected in the blower 50 via the flow path formed by the cyan suction pipe 421.

The mist suction unit 40 includes a magenta mist suction device 412 and a magenta mist suction pipe 422. The magenta mist suction device 412 is the mist suction device 41 provided corresponding to the magenta head 312. The magenta suction pipe 422 is the mist suction pipe 42 that forms a flow path coupling the magenta mist suction device 412 and the blower 50. The magenta mist suction device 412 is provided between the magenta head 312 and the yellow head 313 in the transport direction H. A mist suction opening is formed in the magenta mist suction device 412. The magenta mist suction device 412 is provided so that the mist suction opening thereof faces the outer circumferential surface of the platen drum 20, and is configured to suction ink mist generated by the cyan head 311 and the magenta head 312. The ink mist suctioned by the magenta mist suction device 412 is collected in the blower 50 via the flow path formed by the magenta suction pipe 422.

The mist suction unit 40 includes a yellow mist suction device 413 and a yellow mist suction pipe 423. The yellow mist suction device 413 is the mist suction device 41 provided corresponding to the yellow head 313. The yellow suction pipe 423 is the mist suction pipe 42 that forms a flow path coupling the yellow mist suction device 413 and the blower 50. The yellow mist suction device 413 is provided between the yellow head 313 and the black head 314 in the transport direction H. A mist suction opening is formed in the yellow mist suction device 413. The yellow mist suction device 413 is provided so that the mist suction opening thereof faces the outer circumferential surface of the platen drum 20, and is configured to suction ink mist generated by the cyan head 311, the magenta head 312, and the yellow head 313. The ink mist suctioned by the yellow mist suction device 413 is collected in the blower 50 via the flow path formed by the yellow suction pipe 423.

The mist suction unit 40 includes a black mist suction device 414 and a black mist suction pipe 424. The black mist suction device 414 is the mist suction device 41 provided corresponding to the black head 314. The black suction pipe 424 is the mist suction pipe 42 that forms a flow path coupling the black mist suction device 414 and the blower 50. The black mist suction device 414 is provided between the black head 314 and the UV irradiator 32 in the transport direction H. A mist suction opening is formed in the black mist suction device 414. The black mist suction device 414 is provided so that the mist suction opening thereof faces the outer circumferential surface of the platen drum 20, and is configured to suction ink mist generated by the cyan head 311, the magenta head 312, the yellow head 313, and the black head 314. The ink mist suctioned by the black mist suction device 414 is collected in the blower 50 via the flow path formed by the black suction pipe 424.

In the first embodiment, each of the mist suction opening of the cyan mist suction device 411, the mist suction opening of the magenta mist suction device 412, the mist suction opening of the yellow mist suction device 413, and the mist suction opening of the black mist suction device 414 has the same shape and opening area. Further, in the first embodiment, each of the cyan mist suction pipe 421, the magenta mist suction pipe 422, the yellow mist suction pipe 423, and the black mist suction pipe 424 has the same inner diameter, which is uniform from the front end to the rear end thereof.

Further, in the first embodiment, the length of the black mist suction pipe 424 is shorter than the length of the yellow mist suction pipe 423, the length of the yellow mist suction pipe 423 is shorter than the length of the magenta mist suction pipe 422, and the length of the magenta mist suction pipe 422 is shorter than the length of the cyan mist suction pipe 421. In other words, the flow path formed by the black mist suction pipe 424 is shorter than the flow path formed by the yellow mist suction pipe 423, the flow path formed by the yellow mist suction pipe 423 is shorter than the flow path formed by the magenta mist suction pipe 422, and the flow path formed by the magenta mist suction pipe 422 is shorter than the flow path formed by the cyan mist suction pipe 421. Thus, in the first embodiment, a pressure loss of the flow path formed by the black mist suction pipe 424 is smaller than a pressure loss of the flow path formed by the yellow mist suction pipe 423. Further, in the first embodiment, the pressure loss of the flow path formed by the yellow mist suction pipe 423 is smaller than a pressure loss of the flow path formed by the magenta mist suction pipe 422. Further, in the first embodiment, the pressure loss of the flow path formed by the magenta mist suction pipe 422 is smaller than a pressure loss of the flow path formed by the cyan mist suction pipe 421. In other words, in the first embodiment, the further downstream in the transport direction H the mist suction device 41 is disposed, the greater the air flow rate thereof for suctioning the ink mist.

Figure 2:
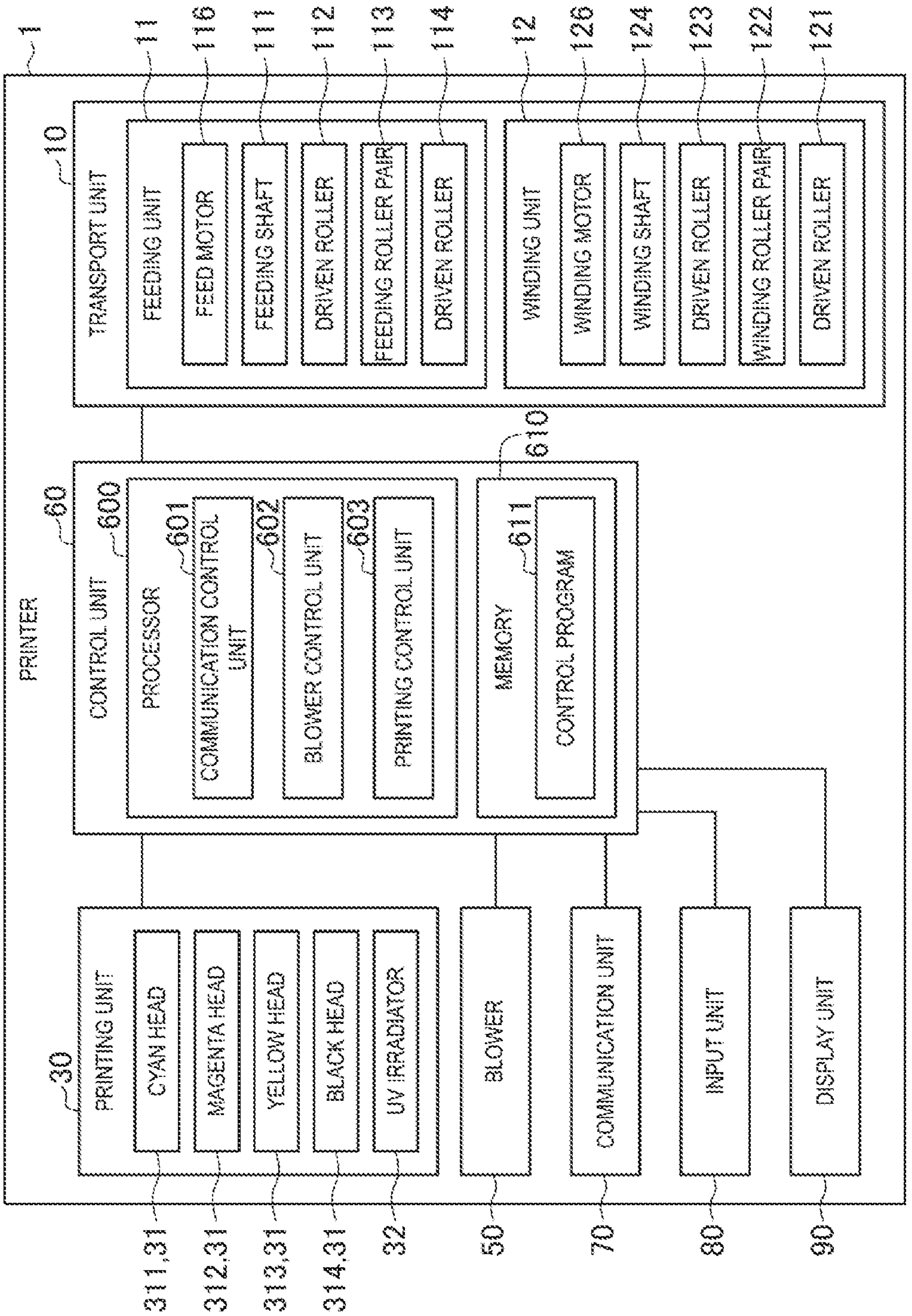
FIG. 2 is a block diagram illustrating a configuration of a control system of the printer.

FIG. 2 is a block diagram illustrating a configuration of a control system of the printer 1.

As illustrated in FIG. 2, the printer 1 includes a control unit 60, the transport unit 10, the printing unit 30, the blower 50, a communication unit 70, an input unit 80, and a display unit 90.

The control unit 60 includes a processor 600 that executes a program of a central processing unit (CPU), a micro-processing unit (MPU), or the like, and a memory 610. The control unit 60 controls each unit of the printer 1 by reading and executing a control program 611 stored in the memory 610. The processor 600 executes the control program 611 stored in the memory 610, and functions as a communication control unit 601, a blower control unit 602, and a printing control unit 603.

The memory 610 stores the control program 610, other programs to be executed by the processor 600, and data to be processed by the processor 600. The memory 610 includes a non-volatile storage area. Further, the memory 610 may include a volatile storage area, and may constitute a work area of the processor 600.

The transport unit 10 includes the feeding unit 11 and the winding unit 12. The feeding unit 11 includes the feeding motor 116, the feeding shaft 111, the driven rollers 112 and 114, and the feeding roller pair 113. The winding unit 12 includes the winding motor 126, the winding shaft 124, the driven rollers 123 and 121, and the winding roller pair 122.

The printing unit 30 includes the inkjet heads 31 of the four colors and the UV irradiator 32.

The blower 50 rotates the fan 51 in accordance with control of the control unit 60 to generate the suction force of each of the mist suction devices 41.

The communication unit 70 is a communication interface including a communication circuit, a connector, and the like, and communicates with an external device in accordance with a predetermined communication standard. The communication standard of the communication unit 70 may be a wired communication standard or a wireless communication standard.

The input unit 80 includes an input portion such as an operation switch or a touch panel provided in the printer 1, and detects an operation on the input portion by a user, and outputs detected information to the control unit 60. Based on the input from the input unit 80, the control unit 60 performs processing corresponding to the operation on the input portion.

The display unit 90 includes a display, and displays information on the display in accordance with control of the control unit 60.

As described above, the processor 600 functions as the communication control unit 601, the blower control unit 602, and the printing control unit 603.

The communication control unit 601 communicates with the external device via the communication unit 70.

The blower control unit 602 controls the driving of the blower 50. The blower control unit 602 starts the driving of the blower 50, and also stops the blower 50. The blower control unit 602 changes the rotational speed of the fan 51 to change the suction force generated by the blower 50, in accordance with printing conditions such as the printing speed, an amount of ink ejected per unit time, and the like.

The printing control unit 603 controls the transport unit 10 and the printing unit 30 to print an image on the medium M.

Figure 3:
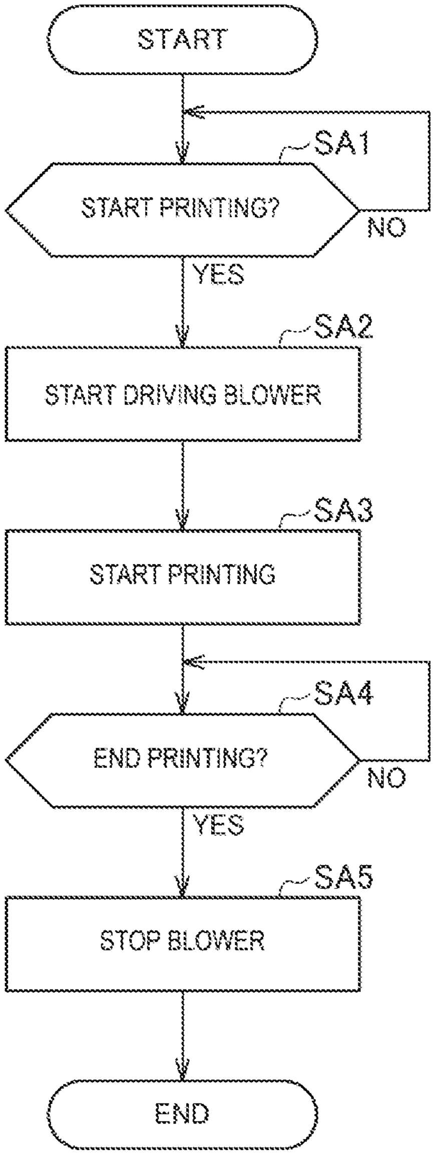
FIG. 3 is a flowchart illustrating an operation of the printer.

FIG. 3 is a flowchart illustrating an operation of the printer 1.

The printing control unit 603 determines whether or not to start printing (step SA1).

For example, when the communication control unit 601 has received the print data from the external device, the printing control unit 603 makes a positive determination at step SA1. Further, for example, when the input unit 80 has detected an operation corresponding to a printing instruction, the printing control unit 603 makes a positive determination at step SA1.

When the printing control unit 603 determines not to start the printing (NO at step SA1), a determination is made again at step SA1.

On the other hand, when the printing control unit 603 determines to start the printing (YES at step SA1), the blower control unit 602 starts driving the blower 50 (step SA2). The blower control unit 602 rotates the fan 51 at a rotational speed per unit time corresponding to the printing conditions.

Subsequently, when the blower control unit 602 starts the driving of the blower 50, the printing control unit 603 starts the printing (step SA3).

Subsequently, the printing control unit 603 determines whether or not to end the printing (step SA4).

For example, when various data included in the print data have been all processed, the printing control unit 603 makes a positive determination at step SA4, and if unprocessed data are included in the print data, the printing control unit 603 makes a negative determination at step SA4.

When the printing control unit 603 determines not to end the printing (NO at step SA4), a determination is made again at step SA4.

On the other hand, when the printing control unit 603 determines to end the printing (YES at step SA4), the blower control unit 602 stops the driving of the blower 50 (step SA5).

According to the first embodiment described above, the following effects are achieved.

A first inkjet head, a second inkjet head, and a third inkjet head, which will be used for describing the effects of the first embodiment, do not refer to any of the specific inkjet heads 31. For example, when the first inkjet head refers to the magenta head 312, the second inkjet head refers to the yellow head 313, and the third inkjet head refers to the black head 314. Further, for example, when the first inkjet head refers to the cyan head 311, the second inkjet head refers to the magenta head 312, and the third inkjet head refers to the yellow head 313.

Further, a first mist suction device, a second mist suction device, and a third mist suction device, which will be used for describing the effects of the first embodiment, do not refer to any of the specific mist suction devices 41. For example, when the first mist suction device refers to the magenta mist suction device 412, the second mist suction device refers to the yellow mist suction device 413, and the third mist suction device refers to the black mist suction device 414. Further, for example, when the first mist suction device refers to the cyan mist suction device 411, the second mist suction device refers to the magenta mist suction device 412, and the third mist suction device refers to the yellow mist suction device 413.

The first mist suction device corresponds to an example of a first mist suction unit. The second mist suction device corresponds to an example of a second mist suction unit. The third mist suction device corresponds to an example of a third mist suction unit.

Further, a first flow path, a second flow path, and a third flow path, which will be used for describing the effects of the first embodiment, do not refer to any of the specific flow paths formed by the mist suction pipes 42. For example, when the first flow path refers to the flow path formed by the magenta mist suction pipe 422, the second flow path refers to the flow path formed by the yellow mist suction pipe 423, and the third flow path refers to the flow path formed by the black mist suction pipe 424. Further, for example, when the first flow path refers to the flow path formed by the cyan mist suction pipe 421, the second flow path refers to the flow path formed by the magenta mist suction pipe 422, and the third flow path refers to the flow path formed by the yellow mist suction pipe 423.

As described above, the printer 1 according to the first embodiment includes the transport unit 10 that transports the medium M, the platen drum 20 that supports the medium M transported by the transport unit 10, the printing unit 30 that includes the inkjet heads 31 and ejects the inks from the inkjet heads 31 to print an image on the medium M supported by the platen drum 20, and the mist suction unit 40 that suctions the ink mist. The printing unit 30 includes the first inkjet head, and the second inkjet head provided downstream of the first inkjet head in the transport direction H of the medium M. The mist suction unit 40 includes the first mist suction device provided between the first inkjet head and the second inkjet head in the transport direction H, the second mist suction device provided downstream of the second inkjet head in the transport direction H, the first flow path coupling the blower 50 and the first mist suction device, and the second flow path coupling the blower 50 and the second mist suction device. The suction force of the second mist suction device is stronger than the suction force of the first mist suction device.

Accordingly, the suction force of the mist suction device 41 provided downstream in the transport direction H is stronger than the suction force of the mist suction device 41 provided upstream in the transport direction H. Thus, the printer 1 can increase a possibility that the downstream mist suction device 41 can suction the ink mist that has not been suctioned by the upstream mist suction device 41. Further, the printer 1 can increase a possibility that the ink mist generated from the inkjet head 31 provided downstream can be suctioned by the mist suction device 41 provided further downstream of that inkjet head 31. Thus, the printer 1 can suppress generation of the ink mist that is not suctioned by the mist suction devices 41, and can thus suppress dispersion of the ink mist inside the printer 1.

A pressure loss of the second flow path is smaller than a pressure loss of the first flow path.

Accordingly, since the air flow rate of the suction of the mist suction device 41 provided downstream in the transport direction H is greater than the air flow rate of the suction of the mist suction device 41 provided upstream in the transport direction H, it is possible to suppress the generation of the ink mist that is not suctioned by the mist suction devices 41. Thus, the printer 1 can suppress the dispersion of the ink mist inside the printer 1 using a simple configuration in which the pressure losses are different in the different flow paths.

The length of the second flow path is shorter than the length of the first flow path.

Accordingly, since the air flow rate of the suction of the mist suction device 41 provided downstream in the transport direction H is greater than the air flow rate of the suction of the mist suction device 41 provided upstream in the transport direction H, it is possible to suppress the dispersion of the ink mist inside the printer 1 using the simple configuration in which the pressure losses are different in the different flow paths.

The printing unit 30 includes the third inkjet head provided downstream of the second inkjet head in the transport direction H. The second mist suction unit is provided between the second inkjet head and the third inkjet head in the transport direction H. The mist suction unit 40 includes the third mist suction device provided downstream of the third inkjet head and configured to suction the ink mist, and the third flow path coupling the blower 50, which generates the suction force of the first mist suction device, the second mist suction device, and the third mist suction device. The suction force of the third mist suction device is stronger than the suction force of the second mist suction device.

Accordingly, the further downstream the mist suction device 41 is disposed in the transport direction H, the stronger the suction force thereof becomes. Thus, it is possible to further increase a possibility that the mist suction devices 41 can suction the ink mist flowing downstream in the transport direction H. Thus, the printer 1 can further suppress the generation of the ink mist that is not suctioned by the mist suction devices 41, and can further suppress the dispersion of the ink mist inside the printer 1.

The printer 1 includes the blower 50.

Accordingly, the printer 1 can suppress the dispersion of the ink mist inside the printer 1 without changing the control method of the blower 50 provided therein.

Second Embodiment

Next, a second embodiment will be described.

When a component of the printer 1 according to the second embodiment shares the same configuration with the component of the first embodiment, that component will be denoted by the same reference sign, and a detailed description thereof will be omitted.

Figure 4:
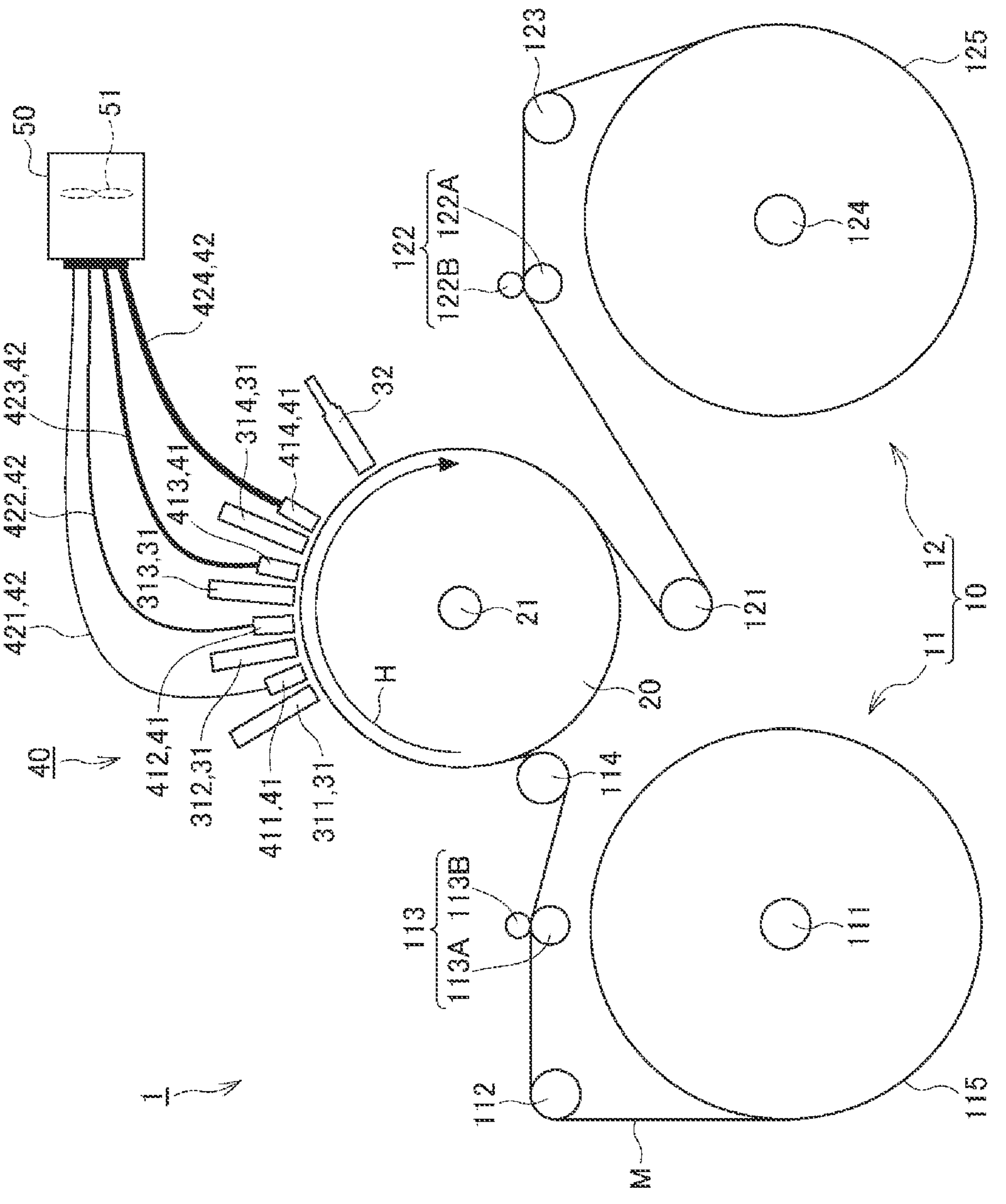
FIG. 4 is a diagram illustrating a configuration of the printer.

FIG. 4 is a diagram illustrating a configuration of the printer 1 according to the second embodiment.

The second embodiment differs from the first embodiment in the inner diameters of the cyan mist suction pipe 421, the magenta mist suction pipe 422, the yellow mist suction pipe 423, and the black mist suction pipe 424.

In the first embodiment, each of the cyan mist suction pipe 421, the magenta mist suction pipe 422, the yellow mist suction pipe 423, and the black mist suction pipe 424 has the same inner diameter. In the second embodiment, the cyan mist suction pipe 421, the magenta mist suction pipe 422, the yellow mist suction pipe 423, and the black mist suction pipe 424 have different inner diameters from each other, respectively. In other words, in the second embodiment, the cross-sectional area of the flow path formed by the mist suction pipe 42 is different for each of the mist suction pipes 42.

In the second embodiment, the inner diameter of the black mist suction pipe 424 is greater than the inner diameter of the yellow mist suction pipe 423, the inner diameter of the yellow mist suction pipe 423 is greater than the inner diameter of the magenta mist suction pipe 422, and the inner diameter of the magenta mist suction pipe 422 is greater than the inner diameter of the cyan mist suction pipe 421. In other words, in the second embodiment, the cross-sectional area of the flow path formed by the black mist suction pipe 424 is greater than the cross-sectional area of the flow path formed by the yellow mist suction pipe 423, the cross-sectional area of the flow path formed by the yellow mist suction pipe 423 is greater than the cross-sectional area of the flow path formed by the magenta mist suction pipe 422, and the cross-sectional area of the flow path formed by the magenta mist suction pipe 422 is greater than the cross-sectional area of the flow path formed by the cyan mist suction pipe 421.

In the second embodiment, each of the mist suction opening included in the cyan mist suction device 411, the mist suction opening included in the magenta mist suction device 412, the mist suction opening included in the yellow mist suction device 413, and the mist suction opening included in the black mist suction device 414 has the same shape and opening area. Further, in the second embodiment, each of the cyan mist suction pipe 421, the magenta mist suction pipe 422, the yellow mist suction pipe 423, and the black mist suction pipe 424 has a uniform inner diameter from the front end to the rear end thereof Note that, in the second embodiment, each of the cyan mist suction pipe 421, the magenta mist suction pipe 422, the yellow mist suction pipe 423, and the black mist suction pipe 424 has the same length. In other words, in the second embodiment, each of the flow path formed by the cyan suction pipe 421, the flow path formed by the magenta mist suction pipe 422, the flow path formed by the yellow mist suction pipe 423, and the flow path formed by the black mist suction pipe 424 has the same length.

According to the second embodiment, the following effects are achieved.

The first inkjet head and the second inkjet head, which will be used for describing the effects of the second embodiment, do not refer to any of the specific inkjet heads 31, in the same manner as the first inkjet head and the second inkjet head used for describing the effects of the first embodiment.

Further, the first mist suction unit and the second mist suction unit, which will be used for describing the effects of the second embodiment, do not refer to any of the specific mist suction devices 41, in the same manner as the first mist suction unit and the second mist suction unit used for describing the effects of the first embodiment.

Further, the first flow path and the second flow path, which will be used for describing the effects of the second embodiment, do not refer to any of the specific flow paths formed by the mist suction pipes 42. in the same manner as the first flow path and the second flow path used for describing the effects of the first embodiment.

In the second embodiment, the printing unit 30 includes the first inkjet head, and the second inkjet head provided downstream of the first inkjet head in the transport direction H of the medium M. In the second embodiment, the mist suction unit 40 includes the first mist suction device provided between the first inkjet head and the second inkjet head in the transport direction H, and the second mist suction device provided downstream of the second inkjet head in the transport direction H, the first flow path coupling the blower 50 and the first mist suction device, and the second flow path coupling the blower 50 and the second mist suction device. In the second embodiment, the cross-sectional area of the second flow path is greater than the cross-sectional area of the first flow path.

Accordingly, since the air flow rate of the suction of the mist suction device 41 provided downstream in the transport direction H is greater than the air flow rate of the suction of the mist suction device 41 provided upstream in the transport direction H, it is possible to suppress the generation of the ink mist that is not suctioned by the mist suction devices 41. Thus, the printer 1 according to the second embodiment can suppress the dispersion of the ink mist inside the printer 1 using a simple configuration in which the cross-sectional areas of the flow paths are different from each other.

Third Embodiment

Next, a third embodiment will be described.

When a component of the printer 1 according to the third embodiment shares the same configuration with the component of the first embodiment, that component will be denoted by the same reference sign, and a detailed description thereof will be omitted.

The third embodiment differs from the first embodiment in the sizes of the mist suction openings.

In the first embodiment, each of the mist suction opening included in the cyan mist suction device 411, the mist suction opening included in the magenta mist suction device 412, the mist suction opening included in the yellow mist suction device 413, and the mist suction opening included in the black mist suction device 414 has the same shape and opening area. In the third embodiment, the opening area of the mist suction opening is different for each of the cyan mist suction device 411, the magenta mist suction device 412, the yellow mist suction device 413, and the black mist suction device 414. In other words, in the third embodiment, the size of the mist suction opening is different for each of the cyan mist suction device 411, the magenta mist suction device 412, the yellow mist suction device 413, and the black mist suction device 414.

In the third embodiment, the mist suction opening included in the black mist suction device 414 is larger than the mist suction opening included in the yellow mist suction device 413, the mist suction opening included in the yellow mist suction device 413 is larger than the mist suction opening included in the magenta mist suction device 412, and the mist suction opening included in the magenta mist suction device 412 is larger than the mist suction opening included in the cyan mist suction device 411.

Further, in the third embodiment, each of the cyan mist suction pipe 421, the magenta mist suction pipe 422, the yellow mist suction pipe 423, and the black mist suction pipe 424 has a uniform inner diameter from the front end to the rear end thereof. In the third embodiment, each of the cyan mist suction pipe 421, the magenta mist suction pipe 422, the yellow mist suction pipe 423, and the black mist suction pipe 424 has the same inner diameter. In the third embodiment, each of the cyan mist suction pipe 421, the magenta mist suction pipe 422, the yellow mist suction pipe 423, and the black mist suction pipe 424 has the same length. In other words, in the third embodiment, each of the flow path formed by the cyan suction pipe 421, the flow path formed by the magenta mist suction pipe 422, the flow path formed by the yellow mist suction pipe 423, and the flow path formed by the black mist suction pipe 424 has the same length.

According to the third embodiment, the following effects are achieved.

Each of the first inkjet head, the second inkjet head, the first mist suction device, the second mist suction device, the first flow path, and the second flow path, which will be used for describing the effects of the third embodiment does not refer to any specific object, in the same manner as in the description of the effects of the first embodiment.

Also, a first opening and a second opening, which will be used for describing the effects of the third embodiment do not refer to any of the specific mist suction openings formed in the mist suction devices 41. For example, when the first opening refers to the mist suction opening included in the magenta mist suction device 412, the second opening refers to the mist suction opening formed in the yellow mist suction device 413. Further, for example, when the first opening refers to the mist suction opening formed in the yellow mist suction device 413, the second opening refers to the mist suction opening formed in the black mist suction device 414.

In the third embodiment, the printing unit 30 includes the first inkjet head, and the second inkjet head provided downstream of the first inkjet head in the transport direction H of the medium M. Further, in the third embodiment, the mist suction unit 40 includes the first mist suction device provided between the first inkjet head and the second inkjet head in the transport direction H, and the second mist suction device provided downstream of the second inkjet head in the transport direction H, the first flow path coupling the blower 50 and the first mist suction device, and the second flow path coupling the blower 50 and the second mist suction device. The first mist suction device has the first opening through which the ink mist is suctioned. The second mist suction device has the second opening through which the ink mist is suctioned. In the third embodiment, the second opening is larger than the first opening.

As a result, the air flow rate of the suction of the mist suction device 41 provided downstream in the transport direction H is greater than the air flow rate of the suction of the mist suction device 41 provided upstream in the transport direction H. Thus, the printer 1 can suppress the generation of the ink mist that is not suctioned by the mist suction devices 41. Thus, the printer 1 according to the third embodiment can suppress the dispersion of the ink mist inside the printer 1 using a simple configuration in which the sizes of the mist suction openings are different from each other.

Fourth Embodiment

Next, a fourth embodiment will be described.

When a component of the printer 1 according to the fourth embodiment shares the same configuration with the component of the first embodiment, that component will be denoted by the same reference sign, and a detailed description thereof will be omitted.

Figure 5:
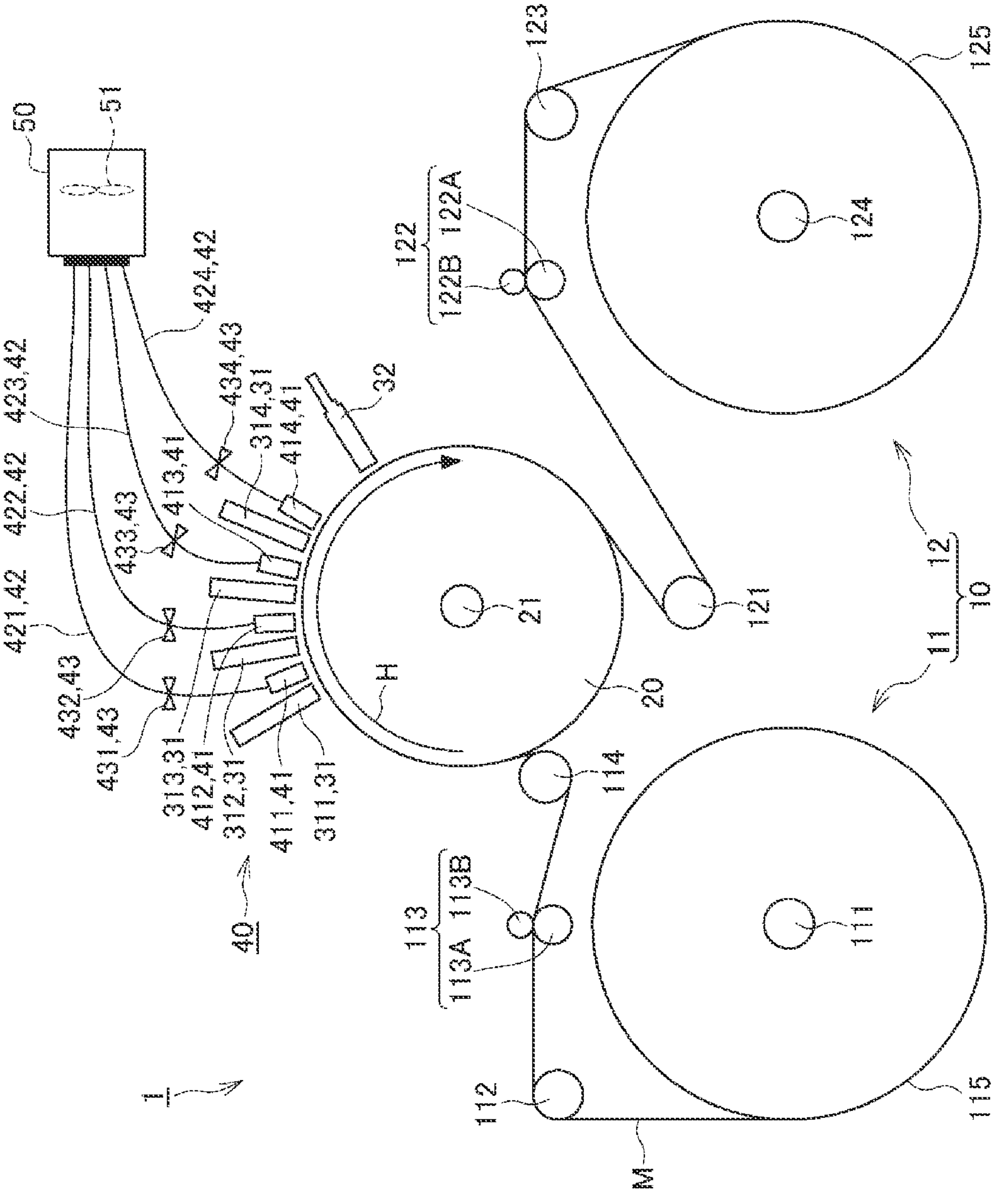
FIG. 5 is a diagram illustrating a configuration of the printer.

FIG. 5 is a diagram illustrating a configuration of the printer 1 according to the fourth embodiment.

As is clear from a comparison between FIG. 5 and FIG. 1, the printer 1 according to the fourth embodiment is provided with a valve 43 in each of the mist suction pipes 42. The valve 43 is an opening/closing valve, and controls the flow rate of the flow path formed by the mist suction pipe 42 installed in the printer 1.

In the following description, the valve 43 provided at the cyan mist suction pipe 421 will be referred to as a "cyan mist suction control valve" and denoted by a reference sign of "431". Further, the valve 43 provided at the magenta mist suction pipe 422 will be referred to as a "magenta mist suction control valve" and denoted by a reference sign of "432". Further, the valve 43 provided at the yellow mist suction pipe 423 will be referred to as a "yellow mist suction control valve" and denoted by a reference sign of "433". Further, the valve 43 provided at the black mist suction pipe 424 will be referred to as a "black mist suction control valve" and denoted by a reference sign of "434".

An opening/closing amount of each of the cyan mist suction control valve 431, the magenta mist suction control valve 432, the yellow mist suction control valve 433, and the black mist suction control valve 434 is adjusted by the control unit 60.

In the fourth embodiment, each of the mist suction opening included in the cyan mist suction device 411, the mist suction opening included in the magenta mist suction device 412, the mist suction opening included in the yellow mist suction device 413, and the mist suction opening included in the black mist suction device 414 has the same shape and opening area. In the fourth embodiment, each of the cyan mist suction pipe 421, the magenta mist suction pipe 422, the yellow mist suction pipe 423, and the black mist suction pipe 424 has a uniform inner diameter from the front end to the rear end thereof Note that, in the fourth embodiment, the inner diameter of the cyan mist suction pipe 421, the inner diameter of the magenta mist suction pipe 422, the inner diameter of the yellow mist suction pipe 423, and the inner diameter of the black mist suction pipe 424 are all the same. In the fourth embodiment, the length of the cyan mist suction pipe 421, the length of the magenta mist suction pipe 422, the length of the yellow mist suction pipe 423, and the length of the black mist suction pipe 424 are the same as each other.

Figure 6:
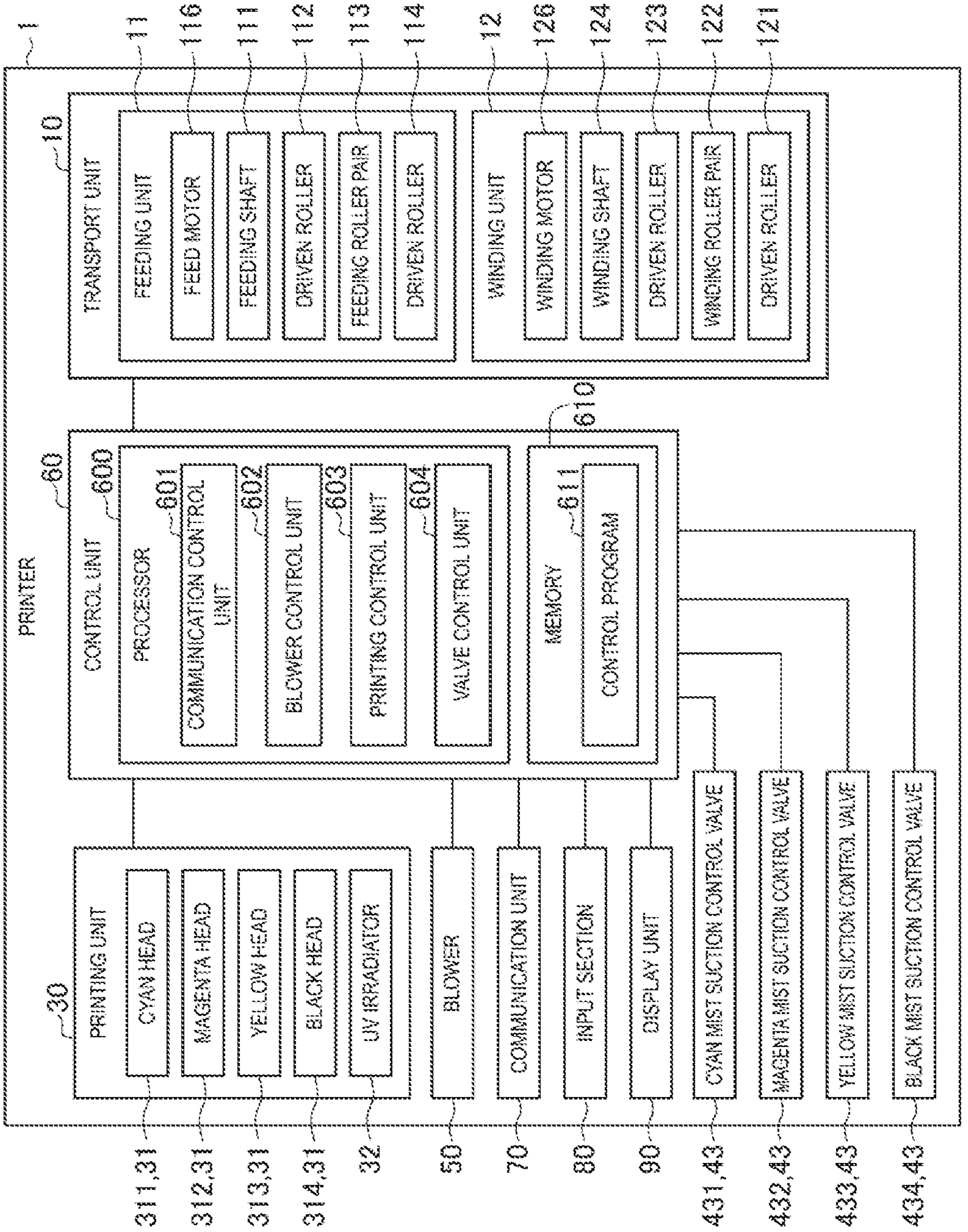
FIG. 6 is a block diagram illustrating a configuration of a control system of the printer.

FIG. 6 is a block diagram illustrating a configuration of a control system of the printer 1 according to the fourth embodiment.

As is clear from a comparison between FIG. 6 and FIG. 2, the processor 600 according to the fourth embodiment functions as the communication control unit 601, the blower control unit 602, the printing control unit 603, and a valve control unit 604.

The valve control unit 604 controls the opening/closing amount of each of the cyan mist suction control valve 431, the magenta mist suction control valve 432, the yellow mist suction control valve 433, and the black mist suction control valve 434. The valve control unit 604 controls the opening/closing amount of each of the cyan mist suction control valve 431, the magenta mist suction control valve 432, the yellow mist suction control valve 433, and the black mist suction control valve 434 at predetermined timings, such as before starting the printing, when the power is turned on, and the like. The valve control unit 604 causes the opening/closing amount of the magenta mist suction control valve 432 to be greater than the opening/closing amount of the cyan mist suction control valve 431. Further, the valve control unit 604 causes the opening/closing amount of the yellow mist suction control valve 433 to be greater than the opening/closing amount of the magenta mist suction control valve 432. Further, the valve control unit 604 causes the opening/closing amount of the black mist suction control valve 434 to be greater than the opening/closing amount of the yellow mist suction control valve 433.

According to the fourth embodiment, the following effects are achieved.

Each of the first inkjet head, the second inkjet head, the first mist suction device, the second mist suction device, the first flow path, and the second flow path, which will be used for describing the effects of the fourth embodiment does not refer to any specific object, in the same manner as in the description of the effects of the first embodiment.

Further, a first valve and a second valve, which will be used for describing the effects of the fourth embodiment do not refer to any of the specific valves 43. For example, when the first valve refers to the magenta mist suction control valve 432, the second valve refers to the yellow mist suction control valve 433. Further, for example, when the first valve refers to the cyan mist suction control valve 431, the second valve refers to the magenta mist suction control valve 432.

In the fourth embodiment, the printing unit 30 includes the first inkjet head, and the second inkjet head provided downstream of the first inkjet head in the transport direction H of the medium M. In the fourth embodiment, the mist suction unit 40 includes the first mist suction device provided between the first inkjet head and the second inkjet head in the transport direction H, and the second mist suction device provided downstream of the second inkjet head in the transport direction H, the first flow path coupling the blower 50 and the first mist suction device, and the second flow path coupling the blower 50 and the second mist suction device. In the fourth embodiment, the mist suction unit 40 includes the first valve provided at the first flow path and the second valve provided at the second flow path. The printer 1 according to the fourth embodiment includes the control unit 60 that causes the opening/closing amount of the second valve to be greater than the opening/closing amount of the first valve.

As a result, the printer 1 according to the fourth embodiment achieves the same effects as those of the printer 1 according to the first embodiment.

Fifth Embodiment

Figure 7:
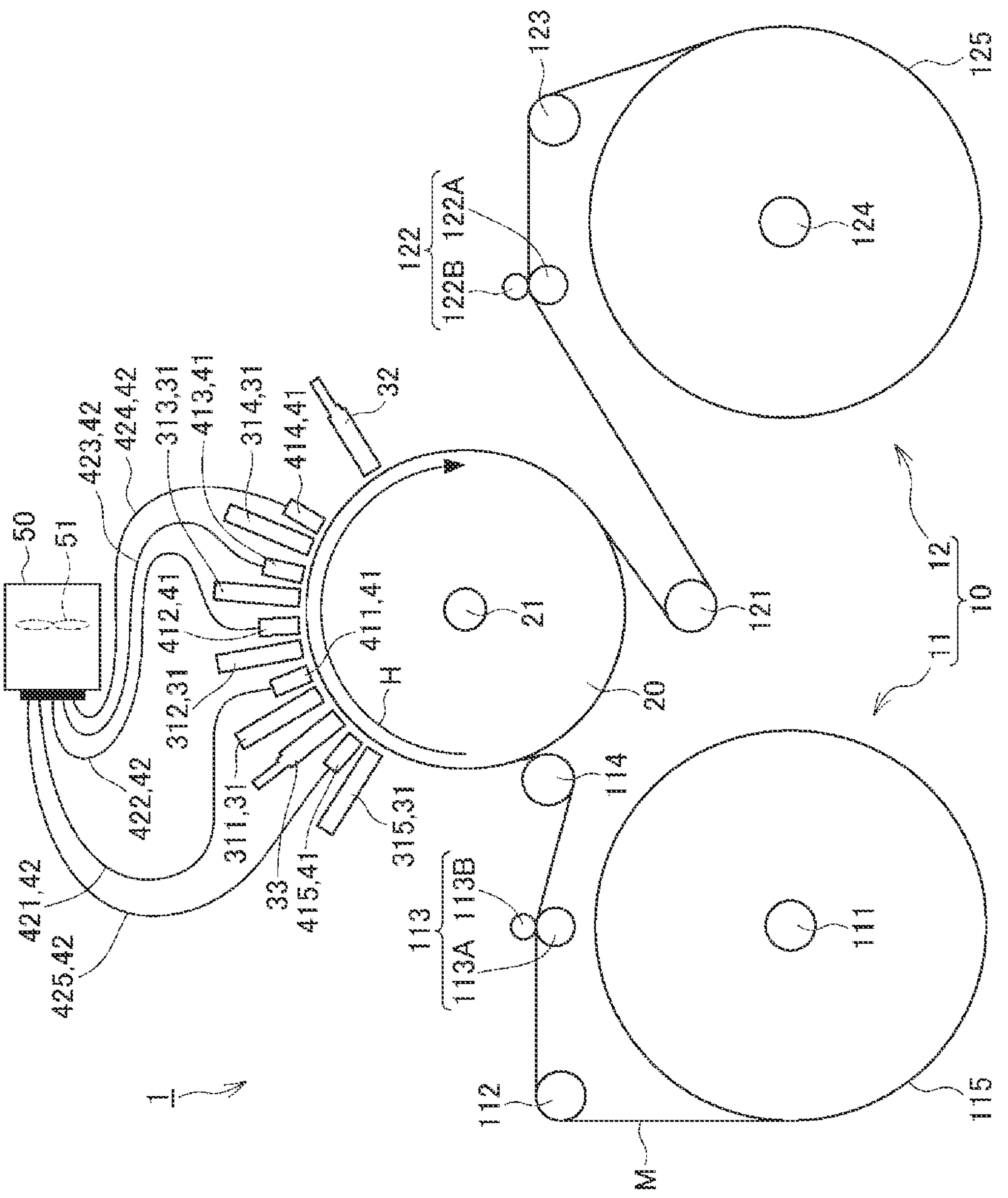
FIG. 7 is a diagram illustrating a configuration of the printer.

FIG. 7 is a diagram illustrating a configuration of the printer 1 according to a fifth embodiment.

As is clear from a comparison between FIG. 7 and FIG. 1, the printing unit 30 of the printer 1 according to the fifth embodiment includes the inkjet head 31 that ejects white ink. Hereinafter, the inkjet head 31 that ejects the white ink will be referred to as a "white head" and denoted by a reference sign of "315".

In the fifth embodiment, the white head 315 corresponds to an example of the third inkjet head.

The white head 315 is a line-type head similar to the other inkjet heads 31. The white head 315 is provided so that a nozzle surface thereof faces the outer circumferential surface of the platen drum 20 with a predetermined gap provided between the nozzle surface and the outer circumferential surface of the platen drum 20. Further, the white head 315 is provided upstream of the cyan head 311 in the transport direction H. The ink ejected by the white head 315 is a UV ink.

The printing unit 30 according to the fifth embodiment includes a UV irradiator 33.

The UV irradiator 33 is provided so that a ultraviolet light irradiation surface thereof faces the outer circumferential surface of the platen drum 20 with a predetermined gap provided between the ultraviolet light irradiation surface and the outer circumferential surface of the platen drum 20. The UV irradiator 33 is provided between the white head 315 and the cyan head 311 in the transport direction H, and cures the ink ejected by the white head 315.

The mist suction unit 40 according to the fifth embodiment further includes a white mist suction device 415 and a white mist suction pipe 425, in addition to the mist suction devices 41 and the mist suction pipes 42 of the first embodiment. The white mist suction device 415 is the mist suction device 41 provided corresponding to the white head 315. The white suction pipe 425 is the mist suction pipe 42 that forms a flow path coupling the white mist suction device 415 and the blower 50. The white mist suction device 415 is provided between the white head 315 and the UV irradiator 33 in the transport direction H. A mist suction opening is formed in the white mist suction device 415. The white mist suction device 415 is provided so that the mist suction opening thereof faces the outer circumferential surface of the platen drum 20, and configured to suction ink mist generated by the white head 315. The ink mist suctioned by the white mist suction device 415 is collected in the blower 50 via the flow path formed by the white suction pipe 425.

In the fifth embodiment, the white mist suction device 415 corresponds to an example of the third mist suction unit.

Further, in the fifth embodiment, the flow path formed by the white mist suction pipe 425 corresponds to an example of the third flow path.

In the fifth embodiment, each of the mist suction openings included in each of the mist suction devices 41 has the same shape and opening area. Further, in the fifth embodiment, the length of the white mist suction pipe 425, the length of the cyan mist suction pipe 421, the length of the magenta mist suction pipe 422, the length of the yellow mist suction pipe 423, and the length of the black mist suction pipe 424 are the same as each other. Further, in the fifth embodiment, each of the white mist suction pipe 425, the cyan mist suction pipe 421, the magenta mist suction pipe 422, the yellow mist suction pipe 423, and the black mist suction pipe 424 has a uniform inner diameter from the front end to the rear end thereof In the fifth embodiment, the inner diameter of the black mist suction pipe 424 is greater than the inner diameter of each of the white mist suction pipe 425, the cyan mist suction pipe 421, the magenta mist suction pipe 422, and the yellow mist suction pipe 423. Further, the inner diameter of the white mist suction pipe 425 is greater than the inner diameter of each of the cyan mist suction pipe 421, the magenta mist suction pipe 422, and the yellow mist suction pipe 423. Further, the inner diameter of the yellow mist suction pipe 423 is greater than the inner diameter of the magenta mist suction pipe 422, and the inner diameter of the magenta mist suction pipe 422 is greater than the inner diameter of the cyan mist suction pipe 421.

The white head 315 is the inkjet head 31 that prints a background image on the medium M. The background image is an underlying image for the image printed by the inkjet heads 31 other than the white head 315. The background image is often printed over a wider area than the image printed by the inkjet heads 31 other than the white head 315. Thus, an amount of ink ejected per unit time by the white head 315 is greater than an amount of ink ejected per unit time by each of the inkjet heads 31 other than the white head 315. Therefore, by causing the suction force of the white mist suction device 415 to be stronger than that of each of the cyan mist suction unit 411, the magenta mist suction device 412, and the yellow mist suction device 413, it is possible to suppress the white ink mist from flowing downstream in the transport direction H.

Note that, in the fifth embodiment, as a method for causing the suction forces of the mist suction devices 41 to be different from each other, a method of causing the inner diameters of the mist suction pipes 42 to be different from each other is exemplified. However, the method for causing the suction forces of the mist suction devices 41 to be different from each other may be a method of causing the lengths of the mist suction pipes 42 to be different from each other, or a method of causing the sizes of the mist suction openings of the mist suction devices 41 to be different from each other.

According to the first embodiment described above, the following effects are achieved.

The first inkjet head and the second inkjet head, which will be used for describing the effects of the fifth embodiment, do not refer to any of the specific inkjet heads 31, and each refers to one of the inkjet heads 31 other than the white head 315.

Further, each of the first mist suction device, the second mist suction device, the first flow path, and the second flow path, which will be used for describing the effects of the fifth embodiment does not refer to any specific object, in the same manner as in the description of the effects of the first embodiment.

In the fifth embodiment, the printing unit 30 includes the first inkjet head, and the second inkjet head provided downstream of the first inkjet head in the transport direction H of the medium M. In the fifth embodiment, the mist suction unit 40 includes the first mist suction device provided between the first inkjet head and the second inkjet head in the transport direction H, and the second mist suction device provided downstream of the second inkjet head in the transport direction H, the first flow path coupling the blower 50 and the first mist suction device, and the second flow path coupling the blower 50 and the second mist suction device. The suction force of the second mist suction device is stronger than the suction force of the first mist suction device. The printing unit 30 according to the fifth embodiment further includes the white head 315. The mist suction unit 40 according to the fifth embodiment further includes the white mist suction device 415 provided between the white head 315 and the first inkjet head and configured to suction the ink mist, and the flow path formed by the white mist suction pipe 425 coupling the blower 50 and the white mist suction device 415. The suction force of the white mist suction device 415 is weaker than the suction force of the second mist suction device and stronger than the suction force of the first mist suction device. The amount of ink ejected by the white head 315 is greater than the amount of ink ejected by each of the first inkjet head and the second inkjet head.

Accordingly, even when a configuration is adopted in which a large amount of the ink mist may flow from upstream in the transport direction H, it is possible to suppress the generation of the ink mist that is not suctioned by the mist suction devices 41. Further, it is possible to suppress the ink mist generated by the white head 315 from flowing downstream of the white head 315 and attaching to the printing medium or the other inkjet heads 31. Thus, even when the configuration is adopted in which a large amount of the ink mist may flow from upstream in the transport direction H, the printer 1 can suppress the dispersion of the ink mist inside the printer 1, and can also ensure the printing quality.

Sixth Embodiment

When a component of the printer 1 according to a sixth embodiment shares the same configuration with the component of the first embodiment, that component will be denoted by the same reference sign, and a detailed description thereof will be omitted.

The printer 1 according to the first embodiment is configured such that the suction force for suctioning the ink mist becomes stronger in the order of the cyan mist suction device 411, the magenta mist suction device 412, the yellow mist suction device 413, and the black mist suction device 414. In the printer 1 according to the sixth embodiment, at least two of the mist suction units 41 of the cyan mist suction device 411, the magenta mist suction device 412, and the yellow mist suction device 413 have the same suction force. Further, in the printer 1 according to the sixth embodiment, the mist suction device 41 provided downstream of the mist suction devices 41 having the same suction force has a stronger suction force than that of the mist suction devices 41 having the same suction force.

In the sixth embodiment, the suction force of the mist suction device 41 is determined based on at least one of the length of the mist suction pipe 42, the inner diameter of the mist suction pipe 42, and the size of the mist suction opening formed in the mist suction device 41.

According to the sixth embodiment described above, the following effects are achieved.

The first inkjet head, the second inkjet head, and the third inkjet head, which will be used for describing the effects of the sixth embodiment, do not refer to any of the specific inkjet heads 31. For example, when the first inkjet head refers to the magenta head 312, the second inkjet head refers to the black head 314 or the yellow head 313, and the third inkjet head refers to the cyan head 311.

Further, the first mist suction device, the second mist suction device, and the third mist suction device, which will be used for describing the effects of the sixth embodiment, do not refer to any of the specific mist suction devices 41. For example, when the first mist suction device refers to the magenta mist suction device 412, the second mist suction device refers to the black mist suction device 414 or the yellow mist suction device 413, and the third mist suction device refers to the cyan mist suction device 411.

Further, the first flow path, the second flow path, and the third flow path, which will be used for describing the effects of the sixth embodiment, do not refer to any of the specific flow paths formed by the mist suction pipes. For example, when the first flow path refers to the flow path formed by the magenta mist suction pipe 422, the second flow path refers to the flow path formed by the back mist suction pipe 424 or the yellow mist suction pipe 423, and the third flow path refers to the flow path formed by the cyan mist suction pipe 421.

In the sixth embodiment, the printing unit 30 includes the first inkjet head, and the second inkjet head provided downstream of the first inkjet head in the transport direction H of the medium M. In the sixth embodiment, the mist suction unit 40 includes the first mist suction device provided between the first inkjet head and the second inkjet head in the transport direction H, and the second mist suction device provided downstream of the second inkjet head in the transport direction H, the first flow path coupling the blower 50 and the first mist suction device, and the second flow path coupling the blower 50 and the second mist suction device. The suction force of the second mist suction device is stronger than the suction force of the first mist suction device. The printing unit 30 further includes the third inkjet head provided upstream of the first inkjet head in the transport direction H. The mist suction unit 40 according to the sixth embodiment includes the third mist suction device provided between the third inkjet head and the first inkjet head in the transport direction H and configured to suction the ink mist, and the third flow path coupling the blower 50, which generates the suction force of the third mist suction device, and the third mist suction device. In the sixth embodiment, the suction force of the third mist suction device is the same as the suction force of the first mist suction device.

Accordingly, since the suction force of the mist suction device 41 provided downstream of the mist suction devices 41 having the same suction force is greater than the suction force of the mist suction devices 41 having the same suction force, the same effects as those of the first embodiment are achieved. Thus, according to the sixth embodiment, even when a configuration is adopted in which the plurality of mist suction devices 41 having the same suction force are provided, it is possible to suppress the dispersion of the ink mist inside the printer 1.

Each of the embodiments described above is merely a specific example to which the present disclosure is applied. The present disclosure is not limited to the configurations in the embodiments described above, and can be implemented in various modes without departing from the gist of the disclosure.

Each of the embodiments described above has the configuration in which the printer 1 includes the blower 50. However, a configuration may also be adopted in which the printer 1 does not include the blower 50, and the ink mist is collected by the blower 50 that is installed outside the printer 1.

In each of the embodiments described above, the blower 50 is exemplified as a suction force generating unit. However, the suction force generating unit is not limited to the blower 50, as long as the suction force generating unit can generate the suction force of the mist suction device 41.

In each of the embodiments described above, as the printing apparatus, the printer 1 is exemplified in which the medium M is supported by the platen drum 20. However, the printing apparatus is not limited to this type of printer 1. The printing apparatus may be a printing apparatus that includes, as the supporting member, a platen that supports the medium M by flattening the medium M to cause the medium M to be placed perpendicular to an ink ejection direction of the inkjet head 31. Further, the printing apparatus is not limited to the printing apparatus that performs the printing on the roll-shaped medium M, but may be a printing apparatus that performs the printing on a printing medium that does not have the roll shape, such as cut paper or cloth.

In each of the embodiments described above, the feeding unit 11 and the winding unit 12 may further include one or a plurality of rollers. The rollers further included in the feeding unit 11 and the winding unit 12 may be driving rollers, driven rollers, or both the driving roller and the driven roller.

In the fifth embodiment, the white head 315 is exemplified as the inkjet head 31 that prints the background image, but the inkjet head 31 that prints the background image may be the inkjet head 31 that ejects an ink of a color other than white.

In each of the embodiments described above, the cyan head 311, the magenta head 312, the yellow head 313, and the black head 314 are exemplified as the inkjet heads 31 that print the image other than the background image. However, the printer 1 may have a configuration in which the inkjet head 31 that ejects an ink of a color other than CMYK is provided. When the inkjet head 31 that ejects the ink of the color other than CMYK is provided, the printer 1 includes, for each of the inkjet heads 31, the mist suction device 41 provided downstream of the inkjet head 31 in the transport direction H.

The communication control unit 601, the blower control unit 602, the printing control unit 603, and the valve control unit 604 may be implemented by a plurality of processors or a plurality of semiconductor chips.

Each functional unit illustrated in FIG. 2 and FIG. 6 is merely an example, and a specific implementation mode is not particularly limited. In other words, hardware individually corresponding to each of the functional units need not necessarily be implemented, and as a matter of course, a configuration is possible in which a single processor executes a program to enable a function of each of the functional units. Further, in the embodiments described above, some of the functions enabled by software may be enabled by hardware, or some of the functions enabled by hardware may be enabled by software. In addition, specific detailed configurations of other functional units of the printer 1 may also be modified as desired.

Units of the steps of the operation in the flowchart illustrated in FIG. 3 are obtained by dividing the operation in accordance with a main processing content to facilitate the understanding of the operation. Thus, the present disclosure is not limited by a method of dividing the processing into processing units, or by the names of the processing units. Depending on the processing content, the processing may be further divided into a greater number of step units. Further, one step unit may be divided so as to include a plurality of processes. Further, the order of the steps may be changed as appropriate without departing from the gist of the present disclosure.

The invention is not limited to the exemplary embodiments described above, and can be realized in various configurations without departing from the gist of the invention. For example, appropriate replacements or combinations may be made to the technical features in the exemplary embodiments which correspond to the technical features in the aspects described in the SUMMARY section to solve some or all of the problems described above or to achieve some or all of the advantageous effects described above. Additionally, when the technical features are not described herein as essential technical features, such technical features may be deleted appropriately.

What is claimed is:

1. A printing apparatus comprising:

a transport unit configured to transport a printing medium;

a supporting member configured to support the printing medium transported by the transport unit;

a printing unit including an inkjet head and configured to eject an ink from the inkjet head onto the printing medium supported by the supporting member, to print an image on the printing medium; and a mist suction unit configured to suction a mist of the ink, wherein the printing unit includes a first inkjet head, and a second inkjet head provided downstream of the first inkjet head in a transport direction of the printing medium, the mist suction unit includes a first mist suction unit provided between the first inkjet head and the second inkjet head in the transport direction, a second mist suction unit provided downstream of the second inkjet head in the transport direction, a first flow path coupling the first mist suction unit with a suction force generating unit configured to generate a suction force of the first mist suction unit and the second mist suction unit, and a second flow path coupling the suction force generating unit with the second mist suction unit, and the suction force of the second mist suction unit is stronger than the suction force of the first mist suction unit.

2. The printing apparatus according to claim 1, wherein a pressure loss of the second flow path is smaller than a pressure loss of the first flow path.

3. The printing apparatus according to claim 1, wherein a length of the second flow path is shorter than a length of the first flow path.

4. The printing apparatus according to claim 1, wherein p1 a cross-sectional area of the second flow path is greater than a cross-sectional area of the first flow path.

5. The printing apparatus according to claim 1, wherein the first mist suction unit includes a first opening configured to suction the mist of the ink, the second mist suction unit includes a second opening configured to suction the mist of the ink, and the second opening is larger than the first opening.

6. The printing apparatus according to claim 1, wherein the mist suction unit includes a first valve provided at the first flow path, and a second valve provided at the second flow path, and the mist suction unit is provided with a control unit configured to cause an opening/closing amount of the second valve to be greater than an opening/closing amount of the first valve.

7. The printing apparatus according to claim 1, comprising the suction force generating unit.

8. The printing apparatus according to claim 1, wherein the printing unit includes a third inkjet head provided downstream of the second inkjet head in the transport direction, the second mist suction unit is provided between the second inkjet head and the third inkjet head in the transport direction, the mist suction unit includes a third mist suction unit provided downstream of the third inkjet head and configured to suction the mist of the ink, and a third flow path coupling the third mist suction unit with the suction force generating unit configured to generate a suction force of the third mist suction unit, and the suction force of the third mist suction unit is stronger than the suction force of the second mist suction unit.

9. The printing apparatus according to claim 1, wherein the printing unit includes a third inkjet head provided upstream of the first inkjet head in the transport direction, the mist suction unit includes a third mist suction unit provided between the third inkjet head and the first inkjet head in the transport direction and configured to suction the mist of the ink, and a third flow path coupling the third mist suction unit with the suction force generating unit configured to generate a suction force of the third mist suction unit, and the suction force of the third mist suction unit is the same as the suction force of the first mist suction unit.

10. The printing apparatus according to claim 1, wherein the printing unit includes a third inkjet head provided upstream of the first inkjet head in the transport direction, the mist suction unit includes a third mist suction unit provided between the third inkjet head and the first inkjet head in the transport direction and configured to suction the mist of the ink, and a third flow path coupling the third mist suction unit with the suction force generating unit configured to generate a suction force of the third mist suction unit, the suction force of the third mist suction unit is weaker than the suction force of the second mist suction unit and stronger than the suction force of the first mist suction unit, and an amount of ink ejected by the third inkjet head is greater than an amount of ink ejected by each of the first inkjet head and the second inkjet head.

* * * * *